United States Patent [19]

Manzoni

[11] Patent Number: 4,558,840
[45] Date of Patent: Dec. 17, 1985

[54] DEVICE FOR MOUNTING A REARVIEW MIRROR CASING ON A SUPPORT MEMBER

[75] Inventor: Stephane Manzoni, Saint-Claude, France

[73] Assignee: Societe Manzoni-Bouchot, France

[21] Appl. No.: 354,107

[22] Filed: Mar. 2, 1982

[30] Foreign Application Priority Data

Mar. 10, 1981 [FR] France .................. 81 04764

[51] Int. Cl.$^4$ ............................................. A47B 97/04
[52] U.S. Cl. ....................................... 248/549; 74/491; 248/484; 248/900; 350/635
[58] Field of Search ............... 248/549, 487, 481, 484, 248/900; 74/501 M, 491; 350/307; 403/70, 131, 125, 124

[56] References Cited

U.S. PATENT DOCUMENTS

| | | | |
|---|---|---|---|
| 2,157,613 | 5/1939 | Hodny | 403/70 |
| 2,565,012 | 8/1951 | Barrett | 248/900 |
| 2,885,235 | 5/1959 | Moskovitz | 403/131 |
| 2,919,599 | 1/1960 | Milton et al. | 74/491 |
| 2,962,933 | 12/1960 | Hezler | 74/501 M |
| 3,250,555 | 5/1966 | Wehner | 403/125 |
| 3,313,077 | 4/1967 | Fuqua | 74/501 M |
| 3,348,425 | 10/1967 | Van Noord | 74/501 M |
| 3,474,686 | 10/1969 | Liedel | 74/501 M |
| 3,552,229 | 1/1971 | Cummins et al. | 74/501 M |
| 3,887,156 | 6/1975 | Hugonnier | 248/549 |
| 4,213,675 | 7/1980 | Pilhall | 74/491 |
| 4,218,036 | 8/1980 | Pitkanen | 248/900 |
| 4,218,037 | 8/1980 | Palamountain | 350/307 |
| 4,357,076 | 11/1982 | Manzoni | 350/307 |
| 4,422,724 | 12/1983 | Otsuka et al. | 350/307 |
| 4,464,016 | 8/1984 | Weber et al. | 248/900 |
| 4,464,017 | 8/1984 | Wada | 248/900 |
| 4,464,594 | 8/1984 | Sharp | 248/900 |

FOREIGN PATENT DOCUMENTS 1000350 8/1965 United Kingdom ............... 248/900

Primary Examiner—Ramon S. Britts
Assistant Examiner—Ramon O. Ramirez
Attorney, Agent, or Firm—Remy J. VanOphem

[57] ABSTRACT

A mounting for joining a mirror casing to a support member. The support member is attached to a vehicle body panel or gusset. An intermediate member secured to the mirror casing is connected to the support member by a single joint which is adjustable and which yields upon impact to the mirror casing. In one embodiment, a control lever may be used to rotate the mirror from inside the vehicle. The control lever is connected to the intermediate member by a releasable pivot joint to allow the mirror casing to pivot relative to the control lever upon impact.

7 Claims, 8 Drawing Figures

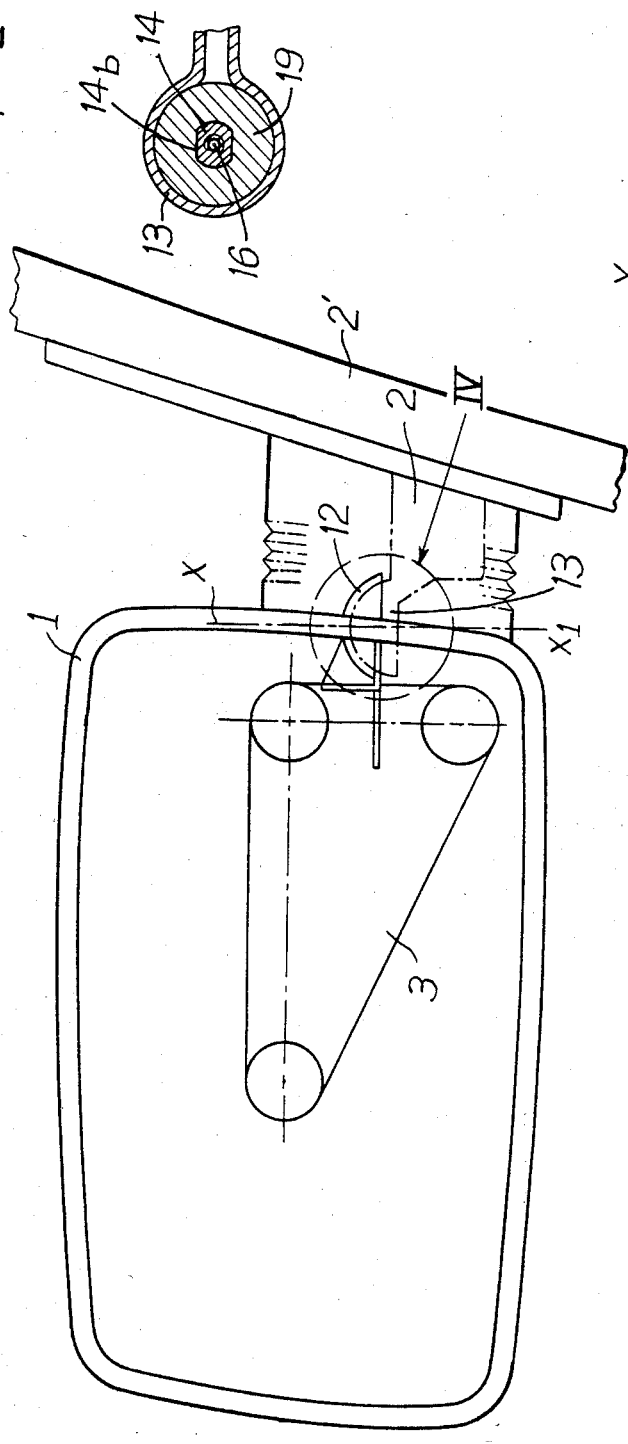
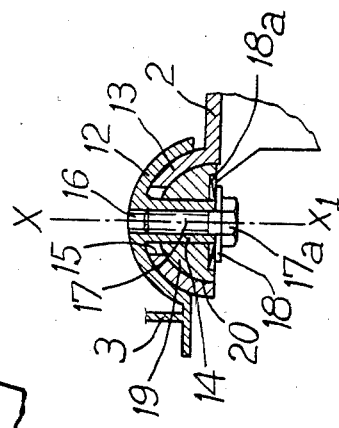

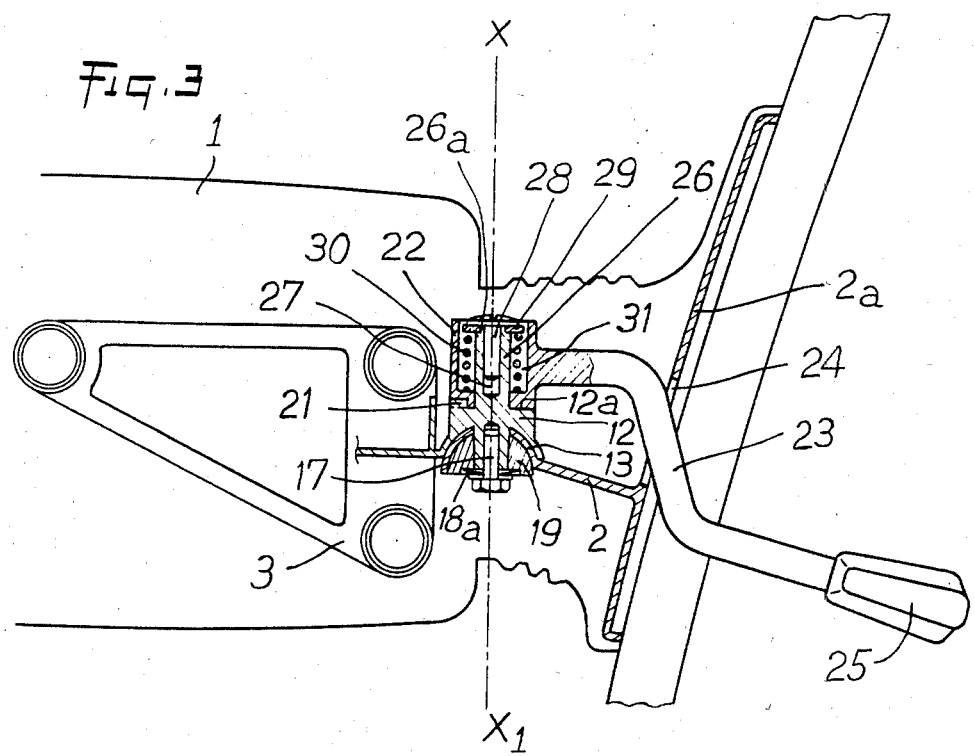
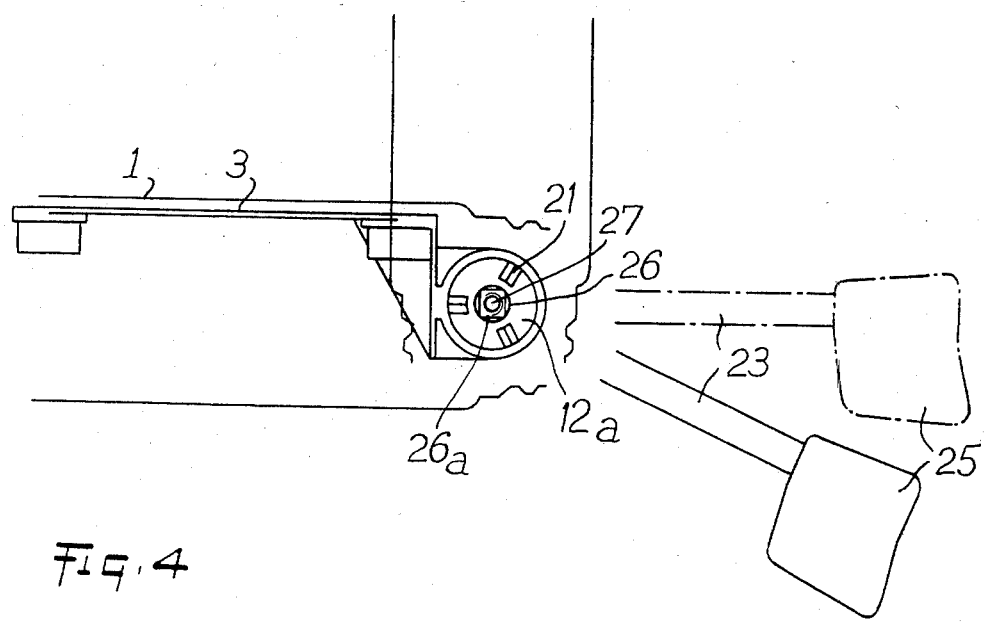

DEVICE FOR MOUNTING A REARVIEW MIRROR CASING ON A SUPPORT MEMBER

BACKGROUND OF THE INVENTION

The present invention relates to a device for mounting a rearview mirror casing on a support member.

To insure the connection between the casing of a rearview mirror and a support member secured to the car door or to the bodywork of the vehicle, it is general practice to use an intermediate member which is secured to the bottom of the casing and which provides a connection for pivotally fixing the casing to the support member.

In the currently known devices, the pivoting, connecting axis is situated on a lug at the lower part of the intermediate member.

The existing arrangement is suitable for mounting a rearview mirror to the panel of a vehicle door but cannot be functionally adapted to the mounting of a rearview mirror to the gusset of a vehicle door.

SUMMARY OF THE INVENTION

According to the present invention, the vertical axis about which the casing pivots in the event of impact is situated in the wall of the casing outside of the bodywork.

Also according to the invention, the intermediate member incorporates on one of its edges, a cup-shaped member presenting a concave bearing surface which rests against a swivel portion integral with the support member. The cup-shaped member is joined to the swivel portion by means of a cross-piece.

The connection between the support member and the intermediate member allows an angular movement which is necessary for the manual adjustment of the rearview mirror casing.

BRIEF DESCRIPTION OF THE DRAWINGS

The invention will be more readily understood by reading the following description with reference to the accompanying drawings in which:

FIG. 1 is an elevational view of a rearview mirror casing mounted on a support member;

FIG. 2 is a detailed view of an axial cross-section of an embodiment of the hinged connection;

FIG. 2a is a cross-sectional view of the hinged connection;

FIG. 3 is an elevational view of a cross-section of another embodiment of the rearview mirror according to the invention;

FIG. 4 is a partial plan view of the rearview mirror shown in FIG. 3;

DETAILED DESCRIPTION OF THE PREFERRED EMBODIMENTS

Figure 5:
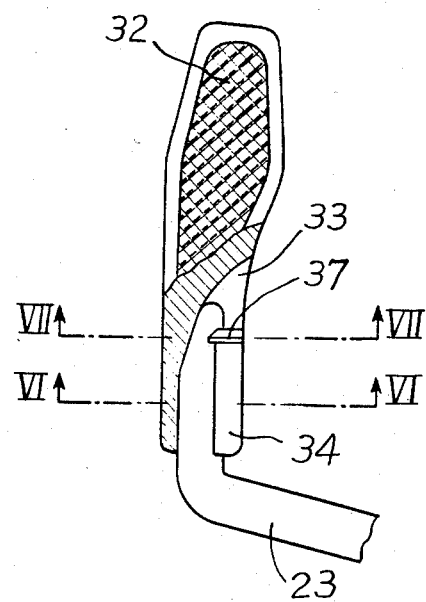
FIG. 5 is an elevational view of a partial cross-section of a system for fastening a control knob on a control lever.

FIG. 1 shows a rearview mirror casing 1, made in this example, of plastic material, which is mounted on a support member or base 2 by way of an intermediate member 3 which consists of a metal plate secured on the base of the casing 1.

The support member 2 is secured in a known manner to the vehicle body panel or gusset 2' of the car door adjacent the window.

On one of the edges of the intermediate member 3, there is provided a concave or cup-shaped member 12, shown in FIG. 2 presenting a concave bearing surface resting against a swivel or concave portion 13 which is integral with the support member 2. The cup-shaped member 12, as shown on FIG. 2, includes a tubular portion 14 extending inside the swivel portion 13 through an opening 15 permitting a spring movement of the tubular portion 14 in all directions. The tubular portion 14 has a flat 14b, more clearly shown in FIG. 2a, which is provided with a tapped hole for a screw 17. Underneath, the head 17a of the screw 17 rests on a washer 18 which compresses an elastic ring 18a against a cross-piece 19 which surrounds the tubular portion 14 and engages the flat 14b and which has a spherical bearing surface 20 of metal or plastic.

It is possible with this particular arrangement to produce a swivel connection with an angular spring movement which provides the ability to adjust the rearview mirror casing manually.

According to the invention, the vertical pivoting axis $XX_1$ of the casing 1 on the support member 2 is situated at the wall of the casing 1 and outside of the bodywork.

FIGS. 3 and 4 show another embodiment in which the cup-shaped member 12 has an upper part which presents a plane face 12a provided with lugs 21 which cooperate with corresponding housings provided in a tubular member 22 which is integral with a control lever 23. The control lever 23 extends into the inside of the vehicle through an orifice 24 provided in the support member portion 2a. The inside end of the control lever 23 is provided with a control knob 25.

The tubular member 22 is mounted to pivot on a rod 26 which extends upwardly from the cup-shaped member 12. The rod has a tapped hole 27 for a screw 28. Under the head of the screw 28 rests a washer 29 which compresses a helical spring 30 against the bottom of the housing 31 of the tubular member 22.

The rod 26 is provided at its upper pair with the male square 26a which engages the square opening of a washer 29. This prevents rotation of the washer and the loosening of the screw 28 when the control lever 23 is actuated.

This particular arrangement makes it possible to actuate the rearview mirror by means of the control lever 23 which moves the tubular member 2. The movement of the tubular member 22 is transmitted to the cup-shaped member 12 and the intermediate member 3, because the helical spring 30 holds the lugs 21 of the cup-shaped member in engagement with the corresponding housings of the tubular member 22.

On the other hand, if the rearview mirror casing 1 is subjected to an impact, it can pivot about the axis $XX_1$ because the helical spring 30, which is compressed under a predetermined pressure, can release the lugs 21 from their housings and allow rotation of the mirror casing 1 with respect to the control lever 23 and the support member 2.

Figure 6:
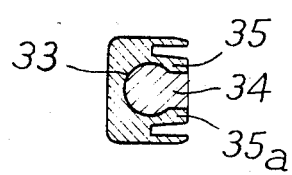
FIG. 6 is a cross-sectional view along line VI—VI of FIG. 5.
Figure 7:
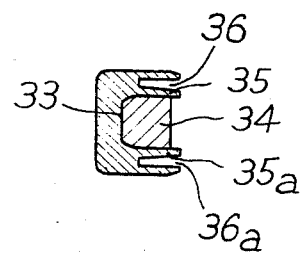
FIG. 7 is a cross-sectional view along line VII—VII of FIG. 5.

FIGS. 5, 6 and 7 show an embodiment of an operating knob 32 of deformable plastic material in the form of a housing 33 with an opening in which is mounted the end of the control lever 23. The operating knob 32 has a boss 34 of rectangular cross-section.

Walls 35, 35a of the housing 33 surround the opening and are in contact with the boss 34. The walls 35 and 35a are reduced in cross-section by two slits 36 and 36a which make the walls 35 and 35a deformable in order to allow detachment of the end of the lever 23 from the operating knob 32 in case of impact.

A tooth 37 is provided at the upper part of the boss 34 to control the position of boss 34 within the walls 35 and 35a.

The invention is in no way limited to the description given hereinabove and on the contrary covers any modifications that can be made thereto without departing from the scope thereof.

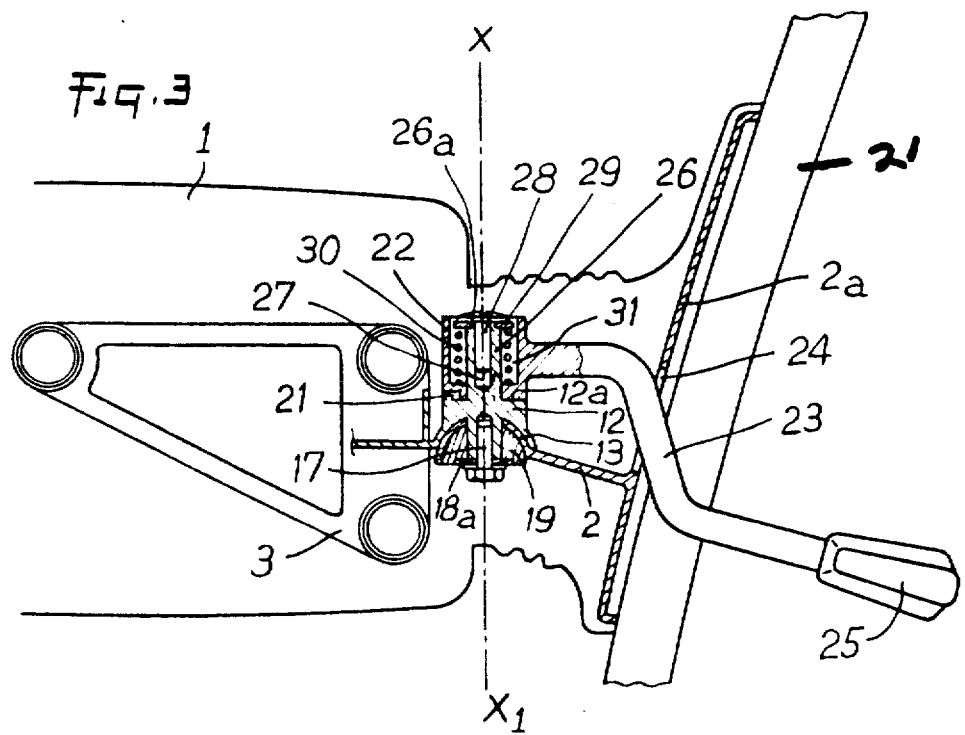

What is claimed is:

1. A mirror mounting device for pivoting a mirror casing relative to a vehicle body gusset upon impact thereof, said mirror mounting device comprising:
   a support member mounted to said vehicle body gusset;
   an intermediate member mounted to said mirror casing; and
   means for mounting said intermediate member to said support member, said mounting means comprising:
      means for pivoting said mirror casing and intermediate member relative to said support member and vehicle body gusset; and
      means for selectively adjusting said mirror casing relative to said vehicle body gusset whereby said selectively adjusting means permits selective manual adjustment of said mirror while said pivoting means permits pivoting of said mirror casing relative to said vehicle body gusset upon impact thereof.

2. A mirror mounting device as claimed in claim 1 wherein said means for mounting said intermediate member to said support member comprises:
   a concave portion extending from said support member;
   a concave member attached to said intermediate member, said concave member having an inner surface, an outer surface and a central axis, said inner surface of said concave member slidably engaging said concave portion of said support member; and
   means for biasing said concave member to said concave portion, said biasing means slidably biasing said concave member into engagement with said concave portion so that said mirror casing is selectively movable relative to said support member.

3. A mirror mounting device for mounting a mirror casing to a vehicle body gusset of a vehicle, said mirror mounting device comprising:
   a support member having a first end and a second opposite end, said first end being mounted to said vehicle body gusset, said second opposite end comprising a concave portion, said concave portion comprising a hole, said hole having a predetermined inner diameter;
   an intermediate member mounted to said mirror casing;
   a concave member attached to said intermediate member, said concave member having an inner surface, an outer surface and a central axis, said concave member further having a tubular portion extending from said inner surface, said tubular portion being disposed concentric with said central axis, said tubular portion having a threaded internal bore, said tubular portion further having a predetermined partial outer diameter and at least one flat external surface, said inner surface of said concave member slidingly engaging said concave portion, said tubular portion extending through said hole in said concave portion, said predetermined partial outer diameter of said tubular portion being smaller than said predetermined inner diameter of said hole whereby said concave member can move relative to said concave portion;
   a cross-piece member inserted in said concave portion, said cross-piece member comprising an annular body, said annular body comprising a rounded upper surface and a flat lower surface, said rounded upper surface engaging said concave portion, said annular body further comprising an inner surface surrounding said tubular portion, said inner surface comprising at least one flat portion, said at least one flat portion engaging said at least one flat external surface of said tubular portion;
   a resilient annular washer abutting said flat surface of said cross-piece member;
   a first threaded fastening means inserted through said resilient annular washer, said first threaded fastening means being threadably inserted into said threaded bore of said tubular portion whereby said resilient annular washer biases said concave member and said concave portion into engagement;
   a face portion on said outer surface of said concave member, said face portion comprising a plurality of lugs and a rod member, said rod member having a threaded bore;
   a tubular member mounted to said rod member and abutting said face portion, said tubular member having an inner bore concentric with said rod member, said tubular member further having a housing end, said housing end selectively engaging said plurality of lugs;
   a control lever attached to said tubular member for manually moving said tubular member;
   a second threaded fastening means threadably inserted into said threaded bore of said rod member; and
   a helical spring located in said inner bore of said tubular member, said helical spring further being interposed said second threaded fastening means in said housing end, said helical spring biasing said housing end into engagement with said plurality of lugs so that manual movement of said tubular member by said control lever selectively adjusts said mirror casing relative to said vehicle body gusset and whereby said housing end can slip relative to said plurality of lugs to permit pivoting of said mirror casing relative to said control lever and said vehicle body gusset upon impact to said mirror casing.

4. A mirror mounting device for pivoting a mirror casing relative to a vehicle body gusset upon impact thereof, said mirror mounting device comprising:
   a support member mounted to said vehicle body gusset;
   an intermediate member mounted to said mirror casing; and
   means for mounting said intermediate member to said support member, said mounting means comprising:
      means for pivoting said mirror casing and intermediate member relative to said support member and vehicle body gusset;

means for selectively adjusting said mirror casing relative to said vehicle body gusset whereby said selectively adjusting means permits selective manual adjustment of said mirror while said pivoting means permits pivoting of said mirror casing relative to said vehicle body gusset upon impact thereof;

a concave portion extending from said support member;

a concave member attached to said intermediate member, said concave member having an inner surface, an outer surface and a central axis, said inner surface of said concave member slidably engaging said concave portion of said support member;

a wall portion integral with said concave portion, said wall portion having a hole therethrough;

a tubular portion projecting from said inner surface of said concave member, said tubular portion disposed concentric with said central axis of said concave member, said tubular portion having at least one flat outer surface and a threaded internal bore, said tubular portion further extending through said hole in said wall portion; and a cross-piece member interposed said tubular portion and said concave portion, said cross-piece member having a central passage, and at least one flat inner surface along said central passage, said cross-piece member mounted to said tubular portion with said at least one flat inner surface of said central passage engaging said at least one flat outer surface of said tubular portion so that said tubular portion and said cross-piece member rotate and pivot together.

5. A mirror mounting device as claimed in claim 4 wherein said biasing means further comprises:

a resilient annular washer abutting said cross-piece member, said resilient annular washer having a central opening; and a threaded fastening means inserted through said central opening of said resilient annular washer, said threaded fastening means being threadably inserted into said threaded internal bore of said tubular portion whereby said resilient annular washer biases said concave portion and said concave member into engagement.

6. A mirror mounting device for pivoting a mirror casing relatively to a vehicle body gusset upon impact thereof, said mirror mounting device comprising:

a support member mounted to said vehicle body gusset;

an intermediate member mounted to said mirror casing; and means for mounting said intermediate member to said support member, said mounting means comprising:

means for pivoting said mirror casing and intermediate member relative to said support member and vehicle body gusset;

means for selectively adjusting said mirror casing relative to said vehicle body gusset whereby said selectively adjusting means permits selective manual adjustment of said mirror while said pivoting means permits pivoting of said mirror casing relative to said vehicle body gusset upon impact thereof;

a concave portion extending from said support member;

a concave member attached to said intermediate member, said concave member having an inner surface, an outer surface and a central axis, said inner surface of said concave member slidably engaging said concave portion of said support member;

means for biasing said concave member to said concave portion, said biasing means slidably biasing said concave member into engagement with said concave portion so that said mirror casing is selectively movable relative to said support member;

a face portion on said outer surface of said concave member;

a rod member extending from said face portion, said rod member having a threaded bore therein;

a plurality of lugs attached to said face portion;

a tubular member mounted to said rod member and abutting said face portion, said tubular member having an inner bore concentric with said rod member, said tubular member further having a housing end for selectively engaging said plurality of lugs;

a control lever attached to said tubular member, said control lever having a first end and a second opposite end, said first end of said control lever being attached to said tubular member;

a threaded fastening means threadably inserted in said threaded bore of said rod member; and a spring located in said inner bore of said tubular member, said spring further being interposed said threaded fastening means and said housing end, said spring biasing said housing end of said tubular member and said plurality of lugs on said face portion of said concave member into engagement so that manual movement of said control lever selectively adjusts said mirror casing relative to said vehicle body gusset and whereby said housing end can slip relative to said plurality of lugs to permit pivoting of said mirror casing relative to said control lever and said vehicle body gusset upon impact to said mirror casing.

7. A mirror mounting device as claimed in claim 6 wherein said control lever further comprises:

a boss integral with said second end of said control lever; and a knob member having a cavity and resilient walls surrounding said cavity, said boss being removably inserted into said cavity, said resilient walls biasing said boss to retain said knob member on said boss such that said knob member separates from said control lever upon impact against said knob member.

* * * * *

UNITED STATES PATENT AND TRADEMARK OFFICE
CERTIFICATE OF CORRECTION

PATENT NO.  :  4,558,840  Page 1 of 2
DATED       :  December 17, 1985
INVENTOR(S) :  Stephane Manzoni It is certified that error appears in the above-identified patent and that said Letters Patent is hereby corrected as shown below:

Column 2, line 44, delete "pair" and insert ---- part ----.

Column 2, line 45, delete "a" and insert ---- the ----.

Column 2, line 51, delete "2" and insert ---- 22 ----.

In the Claims

Column 5, line 47, delete "relatively" and insert ---- relative ----.

In the Drawings

Figure 3 should appear as shown on the attached sheet.

Signed and Sealed this

Seventeenth Day of June 1986

[SEAL]

Attest:

DONALD J. QUIGG

Attesting Officer   Commissioner of Patents and Trademarks

UNITED STATES PATENT AND TRADEMARK OFFICE
CERTIFICATE OF CORRECTION

PATENT NO. : 4,558,840

DATED : December 17, 1985

INVENTOR(S) : Stephane Manzoni

Page 2 of 2

It is certified that error appears in the above-identified patent and that said Letters Patent is hereby corrected as shown below: